UNITED STATES PATENT OFFICE.

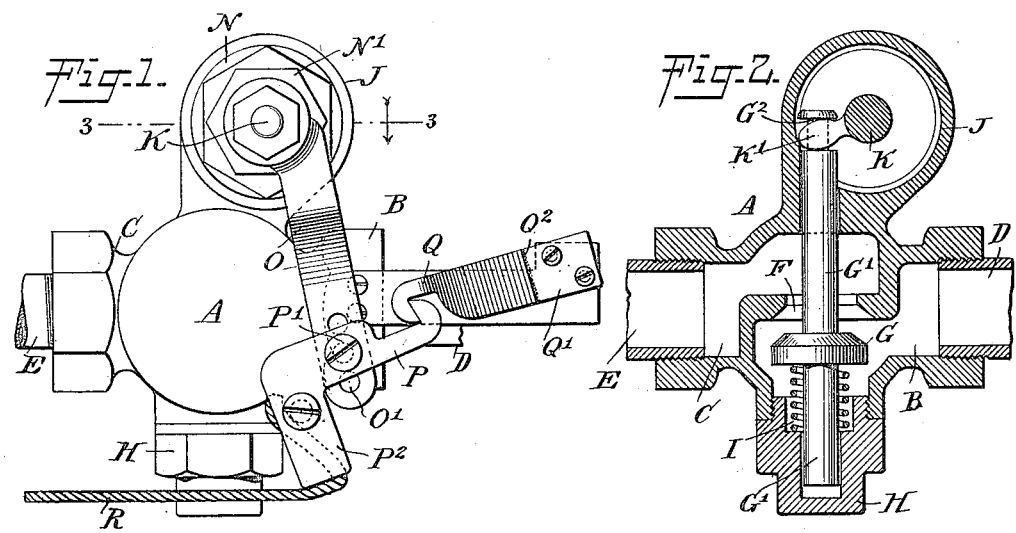
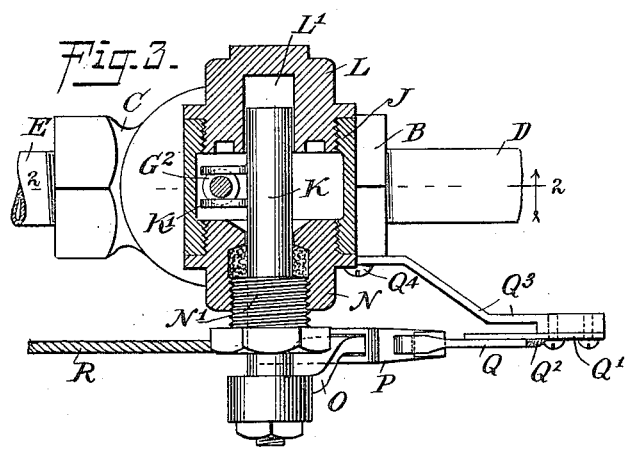
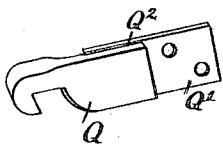
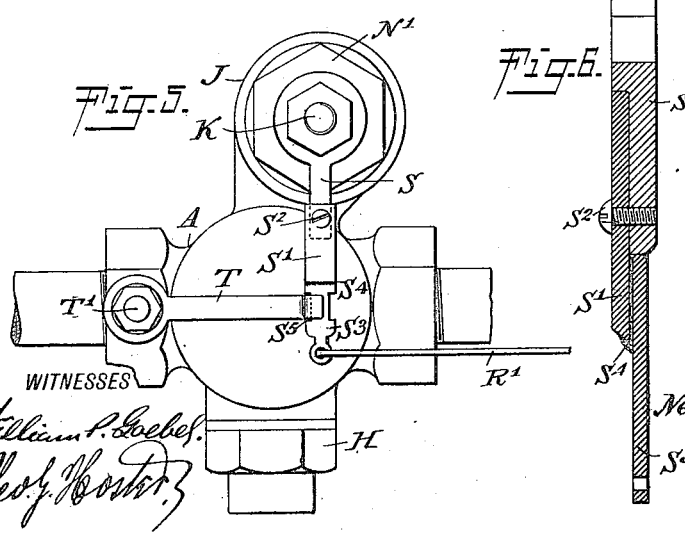
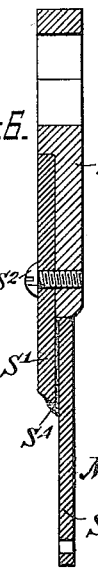

NELSON B. CREIGHTON, OF NEW YORK, N. Y.

VALVE.

1,140,359.

Specification of Letters Patent.

Patented May 25, 1915.

Application filed December 29, 1913. Serial No. 809,262.

*To all whom it may concern:*

Be it known that I, NELSON B. CREIGHTON, a citizen of the United States, and a resident of the city of New York, Elmhurst, borough of Queens, in the county of Queens and State of New York, have invented a new and Improved Valve, of which the following is a full, clear, and exact description.

The object of the invention is to provide a new and improved valve arranged to normally hold the valve in an open position for the passage of gas, liquid or other fluid, to allow the valve to close automatically in case of a fire and to permit releasing the valve from a distant point whenever it is desired to close the valve with a view to stop the flow of the fluid through the valve.

In order to accomplish the desired result use is made of a spring-pressed valve disk engaged at its stem by an actuating device for normally holding the said valve disk in an open position, and a releasing device engaging the said actuating device and including an arm provided with a pivoted catch normally engaging a retaining hook and fusible solder for holding the said retaining hook under ordinary temperature for detaching the retaining hook at a higher temperature to release said actuating device with a view to allow the valve disk to move to its seat and thus close the valve.

A practical embodiment of the invention is represented in the accompanying drawings forming a part of this specification, in which similar characters of reference indicate corresponding parts in all the views.

Figure 1 is a side elevation of the valve; Fig. 2 is a sectional side elevation of the same on the line 2—2 of Fig. 3; Fig. 3 is a sectional plan view of the same on the line 3—3 of Fig. 1; Fig. 4 is a perspective view of the retaining hook; Fig. 5 is a side elevation of a modified form of the valve; and Fig. 6 is an enlarged cross section of the releasing arm shown in Fig. 5.

The valve body A of the valve is provided with an inlet B and an outlet C connected with the pipes D and E, respectively, and intermediate the said inlet B and the said outlet C is arranged a valve seat F on which is adapted to be seated a valve disk G having a stem G', the lower end of which is mounted to slide in a cap H screwing on the bottom of the valve body A. The spring I is coiled on the lower portion of the valve stem G' and rests with one end on the cap H while the other end presses against the under side of the valve disk G to move the latter onto the seat F whenever downward force against the valve disk is released, as hereinafter more fully explained.

The upper end of the valve stem G' extends into a chamber J formed on the valve body A and into the said chamber extends a rock shaft K provided with a fork adapted to engage the upper reduced end $G^2$ of the valve stem G' to press the latter downward and likewise the valve disk G to hold the latter normally off its seat, as plainly indicated in Fig. 2.

One end of the chamber J is closed by a screw plug L and the other end is closed by a screw plug N adapted to be interchanged with the plug L so as to permit the use of the plugs L and N on either end of the chamber J. The screw plug L is provided with a bearing L' for the inner end of the rock shaft K, and the screw plug N is provided with a stuffing box N' in which is journaled the other outer end of the rock shaft K. On the outer terminal of the rock shaft K is secured an arm O provided with a series of apertures O' either of which is adapted to be engaged by a pivot P' for a catch P to swing on, the said catch P normally engaging a retaining hook Q to hold the parts in the position shown in Figs. 1, 2 and 3, that is, with the valve disk G off the seat F. The retaining hook Q is attached to a plate Q' by the use of solder $Q^2$ fusible at a high temperature, so that when the valve is heated, say by a fire that breaks out in a building or from any other cause, the solder $Q^2$ melts and the retaining hook Q becomes detached from the plate Q' thus releasing the hook Q and the arm O to allow the valve disk G to move to its seat F by the action of its spring I to automatically close the valve. The plate Q' is secured to a bracket $Q^3$ fastened by screws $Q^4$ or other fastening devices to the valve body A at one side thereof, it being understood that when the caps L and N are interchanged on the chamber J the bracket $Q^3$ is attached to the other side of the valve body.

The catch P is provided with an angular extension $P^2$ to which is secured one end of a cable, rod or other connection R extending to a distant place, to permit the operator at said distant place to swing the catch P out of engagement with the retaining hook Q by exerting a pull on the connection R. It is understood that when a swinging motion is given to the catch P in the manner described, the arm O is released to allow the valve G to move to its seat F by the action of the spring I with a view to close the valve. It is also understood that when the several parts are in the position shown in Figs. 1, 2 and 3, the spring I is pressed and the valve disk G is held open by the action of the fork K' on the rock shaft K locked in place by the arm O and the catch P engaging the retaining hook Q. Now when the hook Q is disconnected from the plate Q' by the solder Q² melting then the spring I forces the valve disk G to its seat to close the valve, and a like result is obtained on the operator exerting a pull on the connection R to disengage the catch P from the retaining hook Q. From the foregoing it will be seen that the valve disk G is normally held open against the tension of its spring I and when released the valve is held to its seat by the action of the spring I.

In the modified form shown in Figs. 2 and 6 the arm S secured on the outer end of the rock shaft K is provided with an extension plate S' secured to the arm S by a screw S², and on the said plate S' is fastened a plate S³ by the use of fusible solder S⁴. An abutment T engages a notch S⁵ on the plate S³ to normally hold the arm S in the position shown in Fig. 5 with the valve G then in open position, the same as above described and shown in Fig. 2. The abutment T is secured to a stud T' held on the valve body A. Now in case of a fire the solder S⁴ is melted to disconnect the plate S³ from the plate S' thus releasing the arm S and allowing the valve G to close by the action of its spring I. The terminal of the plate S³ is connected by a connection R' with a distant point to permit of closing the valve disk G whenever it is desired to do so, by the operator, the latter then exerting a pull on the connection R'.

Having thus described my invention, I claim as new and desire to secure by Letters Patent:

1. A valve, comprising a valve body having an inlet, an outlet and a valve seat intermediate the said inlet and outlet, a spring-pressed valve disk adapted to be seated on the said valve seat, means including an arm for engaging the valve disk for moving it off its seat, and a locking and releasing catch mounted on the said arm, a fixed retaining means adapted to be engaged by the said catch so as to hold the valve off its seat, said retaining means comprising fusible solder whereby the said retaining means is held in its normally fixed position under ordinary temperature but detached at a higher temperature.

2. A valve, comprising a valve body having an inlet, an outlet and a valve seat intermediate the said inlet and outlet, a spring-pressed valve disk adapted to be seated on the said valve seat, means including an arm for engaging the valve disk for moving it off its seat, a catch pivoted on the said arm, a retaining hook adapted to be engaged by the said catch so as to hold the valve off its seat and a flexible connection connected with the said catch to permit of swinging the catch out of engagement with the said hook.

3. A valve, comprising a valve body having an inlet, an outlet, and a valve seat intermediate the said inlet and outlet, a spring-pressed valve disk adapted to be seated on the said valve seat, means including an arm for engaging the valve disk for moving it off its seat, a catch pivoted on the said arm, a fixed retaining hook adapted to be engaged by the said catch so as to hold the valve off its seat, a flexible connection connected with the said catch to permit of swinging the catch out of engagement with the said hook, said retaining hook comprising fusible solder whereby the said hook is held in its normally fixed position under ordinary temperature, but detached at a higher temperature.

4. A valve, comprising a valve body having an inlet, an outlet and a valve seat intermediate the said inlet and outlet, a spring-pressed valve disk adapted to be seated on the said valve seat, means including an arm for engaging the valve disk for moving it off its seat, a catch pivoted on the said arm, a hook adapted to be engaged by the said catch so as to hold the valve off its seat, a fixed support, and fusible solder fastening the said hook to the said support under ordinary temperature but detaching the hook from the support at a higher temperature.

5. A valve comprising a valve body having an inlet and outlet and valve seat intermediate the said inlet and outlet, a spring pressed valve disk adapted to be seated on the said valve seat, means including an arm for engaging the valve disk for moving it off its seat, an angular catch adjustably and pivotally mounted on said arm, a fixed retaining hook adapted to be engaged by the said catch and a flexible connection connected with the said catch, to permit of swinging the catch out of engagement with the said hook.

6. A valve comprising a valve body having an inlet and outlet and a valve seat intermediate the said inlet and outlet, a valve disk adapted to be seated on the said valve seat, a valve stem extending from said valve disk and reduced near its upper end, means including an arm, a rock shaft and a finger or fingers projecting therefrom to engage the reduced upper end of the valve stem for moving the valve to and from its seat, a locking and retaining catch mounted on the said arm, a fixed retaining means adapted to be engaged by the said catch, the said retaining means comprising fusible solder whereby the said retaining means is held in its normally fixed position under ordinary temperature, and a flexible connection connected with the said catch to permit manual operation of the valve.

7. A valve comprising a valve body having an inlet an outlet and a valve seat intermediate the said inlet and outlet, a spring pressed valve disk adapted to be seated on the said valve seat, means including an arm for engaging the valve disk for moving it off its seat, and a rigid retaining member mounted on the casing engaging said arm, a flexible connection operably connected with said arm, said retaining member comprising fusible solder whereby the retaining member is held in engagement with the said arm under ordinary temperature.

In testimony whereof I have signed my name to this specification in the presence of two subscribing witnesses.

NELSON B. CREIGHTON.

Witnesses:
 THEO. G. HOSTER,
 PHILIP D. ROLLHAUS.

Copies of this patent may be obtained for five cents each, by addressing the "Commissioner of Patents, Washington, D. C."